Sept. 26, 1939.  G. WERNER  2,174,049
FILM CLIP
Filed Jan. 24, 1938
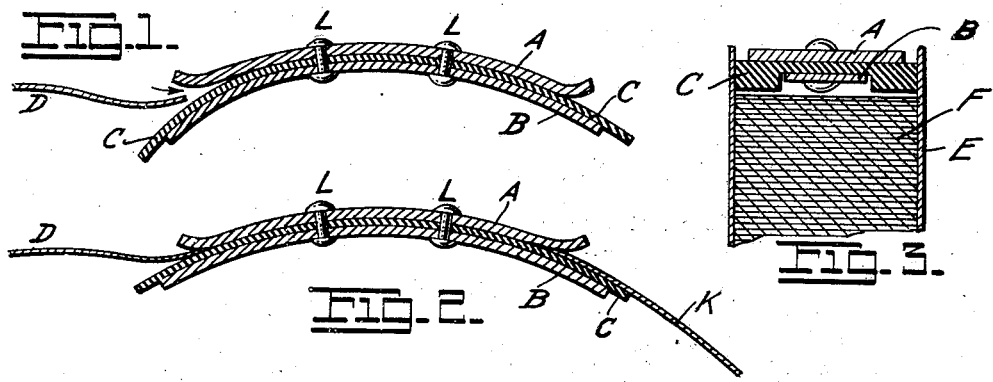
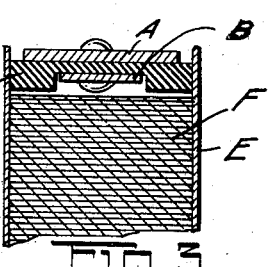
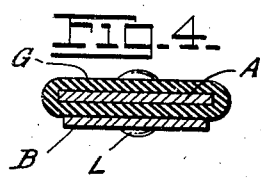
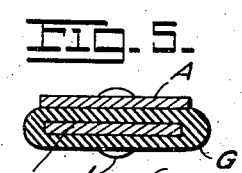
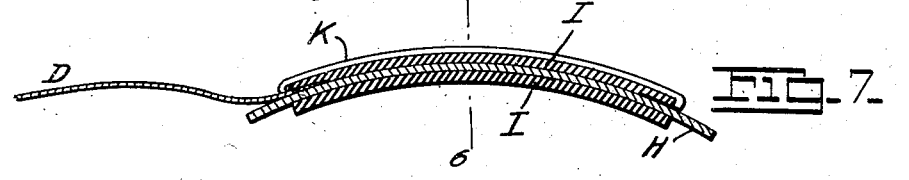
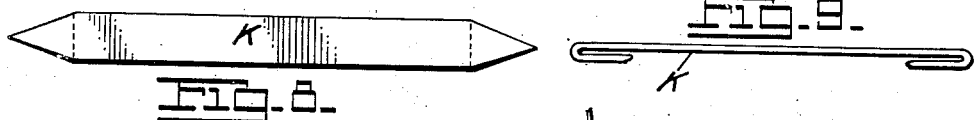
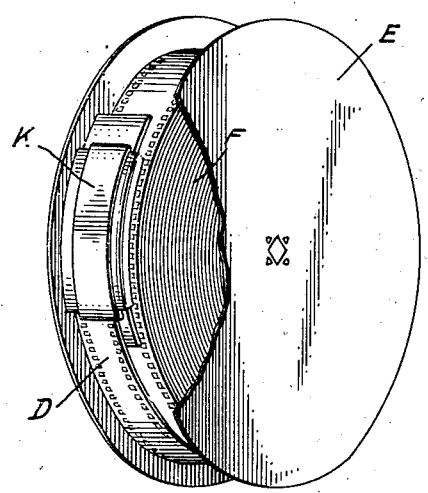
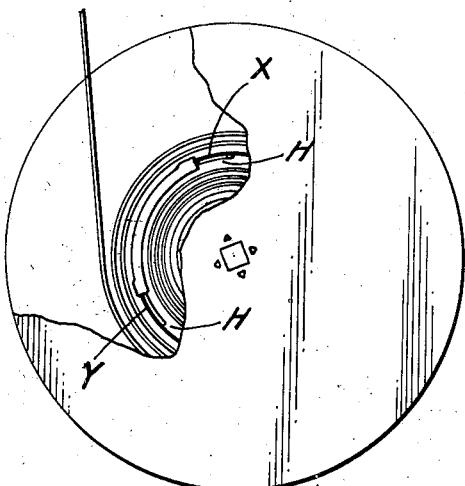
Inventor.

Patented Sept. 26, 1939

2,174,049

UNITED STATES PATENT OFFICE 2,174,049

FILM CLIP

Guenther Werner, Peking, China, assignor to Gerhard Von Hessert, New York, N. Y.

Application January 24, 1938, Serial No. 186,531
In Germany June 8, 1937

6 Claims. (Cl. 24—81)

This invention relates to a double ended clip for use with any standard or other sized cine film reel having side flanges as a means of holding the free end of a film in the reel so that the film does not become unwound from the reel or the end project beyond the flanges of the reel to become torn or damaged. A label may be attached to the other end of the clip when thus used, or it may be stretched along the top of the clip. The clip may also be used as a means of temporarily fastening together the broken ends of a film that breaks during projection.

There are usually difficulties in the way of satisfactorily holding the loose ends of films on reels. They are generally held by stretching a rubber band around the convolutions of the film. This has the disadvantage that the rubber band is likely to slip between the edges of the convolutions of the film and the flange of the reel, and further that the pressure exerted by the rubber as a result of its tension is likely to cause scratches on the film surface.

The present invention relates to a new and improved film clip which consists of a piece or pieces of metal or other hard material combined with a rubber sheath or pad. The metal or hard material gives form and rigidity to the clip and the rubber pad secures it to the reel by frictional engagement with the flanges of the reel.

In the annexed drawing Fig. 1 shows one form of the film clip in longitudinal section about to receive the end of a piece of film. Fig. 2 shows the same clip in the same section firmly holding the end of the film. Fig. 3 is a transverse section of a film clip in place in a reel. Figs. 4 and 5 are transverse section of two arrangements of a modification of the film clip. Fig. 6 is a transverse section of another modification of the film clip. Fig. 7 is a longitudinal section of the same. Fig. 8 illustrates a form of label which may be applied to the film clip and Fig. 9 shows the manner of its application to the form shown in Fig. 7. Fig. 10 is a perspective of the reel with one of the flanges of the reel partly broken away to show the assembled relation of the clip and reel. Fig. 11 is an elevation of the reel with one of its flanges partly broken away to show the clip when used as a splicing device in the clip and reel assembly.

Fig. 1 shows the first form of the film clip. It consists of two pieces or plates of metal or other hard material A and B having between them the rubber pad C. The plate A is the shortest of the elements and it is not quite as broad as the space between the flanges of the reel in which it is to be used. The rubber pad C is both the longest and widest of the elements. Its width is slightly greater than the space between the flanges of the reel in which it is to be used. This element is either a plain rubber strip as shown in Figs. 1 and 2 or it may be recessed on the underside to allow the element B to be completely contained in the recess as shown in Fig. 3. The element B is longer and narrower than the element A. The three elements are permanently connected together by rivets L or other suitable means.

In use the clip is applied as follows. When a length of film F has been wound on to a reel E (Figs. 3 and 10) the free end D is presented to one end of the clip as in Fig. 1. Pressure being applied to the elements C and B at the end of the clip nearer the film thereby flexing their ends away from the element A, offering an opening into which the end of the film D is placed. The pressure on C and B being released, the elasticity of the element B forces them back into contact with A with the end of the film D firmly held between the lip of the upper element A and the soft bed afforded by the rubber pad C, Fig. 2. A label K of paper, card or other suitable material may be similarly placed in the other end of the clip. The whole clip is then pressed between the flanges of the reel, as shown in Fig. 3 (this section shows a recessed form of the element C). Fig. 10 shows a third form of the clip in place on a reel. The rubber pad C being slightly wider than the space between the flanges is therefore compressed and presses tightly against them. The friction resulting from this pressure against the flanges of the reel serves to hold the clip in place.

The fact that the two ends of the clip are similar, and that both may be used to grip the end of a film makes the clip useful when a film breaks in projection. The two ends of the broken apart sections of the film are inserted into opposite ends of the clip, preserving the continuity of the film until it can be repaired and permitting the projection to be continued immediately. Fig. 11 shows this application of the clip (in its third form where X and Y are the ends of the broken apart portions of the film).

The film clip described above is a first form of the clip. I have devised two other modified forms of the clip, which I will now describe.

Figs. 4 and 5 show two arrangements of the second form. In this form the rubber pad G is of tubular section, completely encasing either of the two other elements A and B which are the same as in the first form. In Fig. 4 it is shown encasing A, in Fig. 5 encasing B. In either case the dimensions of the element encased are such that the rubber pad G is slightly wider than the space between the flanges of the reel in which it is to be used. The clip shown in Fig. 5 functions in all ways similarly to that shown in Figs. 1-3. That shown in Fig. 4 functions in a similar manner except that the end of the film is secured between the element B and the rubber pad and not between A and the pad as in the other cases. This form has a better frictional grip on the flanges of the reel than the first, owing to the greater restriction on the freedom of distortion of the rubber pad G, imposed by this arrangement, the protruding edges of the pad being no longer unrestricted in their downward movement, as in C in Figs. 1-3.

The third form of the film clip is shown in Figs. 6 and 7. Here there is but one metal or hard piece or plate H combined with a tubular rubber pad I. The element H is longer than the element I and its width is such as gives the rubber pad I a width slightly wider than the space between the flanges of the reel in which the clip is to be used. To apply the clip when a length of film has been wound on to a reel and the free end of the film D is presented to one end of the clip and inserted between the element H and the rubber element I, as shown in Fig. 7 where it is firmly held by the tension of the rubber. A label may be either inserted in the opposite end of the clip in the same way, or it may be displayed along the top of the clip as shown in Fig. 7, where it is marked K. Figs. 8 and 9 show one form of label. K is a label of paper or other suitable material having a rectangular body and pointed ends. The rectangular portion of the label is the same length as the rubber pad I. The pointed ends are folded under as shown in Fig. 9 and in turn inserted between the pad I and the plate H at either end of the clip, as shown in Fig. 7.

This third form of the film clip has the advantage over the first form of better frictional grip on the flanges of the reel in the same way as the second form. It has the following additional advantages, that it may be produced more cheaply, and that as there are no rivets protruding from the top of the device a label may be smoothly applied along its top surface as described above. Further, as there is but the one plate of metal or hard material it may be bent to accord with the differing diameters at which it may be used.

It will be understood that the invention is not limited to the specific embodiments shown, and that various deviations may be made therefrom without departing from the spirit and scope of the appended claims.

What I claim is:

1. In combination with a film reel having side flanges a clip comprising plates of hard material and a rubber pad said pad being wider than the space between the flanges of the reel thereby adhering thereto by friction.

2. In combination with a film reel having side flanges a clip comprising plates of hard material and a rubber pad said pad being recessed on the underside thereof wholly containing the lower of said plates in said recess said pad being wider than the space between the flanges of the reel thereby adhering thereto by friction.

3. In combination with a film reel having side flanges a double ended clip comprising two plates of hard material connected together having between them a rubber pad said pad being wider than the space between said flanges and adhering thereto by friction, one end of said clip retaining the free end of film wound on said reel and the other end holding a label, substantially as described in the specification.

4. In combination with a film reel having side flanges a double ended clip comprising two plates of hard material connected together one of the said plates being encased in a surrounding rubber pad said pad being wider than the space between said flanges and adhering thereto by friction one end of said clip retaining the free end of film wound on said reel and the other end holding a label.

5. In combination with a film reel having side flanges a double ended clip comprising one plate of hard material encased for part of its length in a tubular rubber pad said pad being wider than the space between said flanges and adhering thereto by friction one end of said clip adapted for retaining the free end of film wound on said reel, and the other end of said clip being adapted to retain a label being displayed on the upper side of the said clip substantially as described in the specification.

6. In combination with a film reel having side flanges a double ended clip comprising a plate or plates of hard material and a rubber pad said pad being wider than the space between the flanges of the reel adhering thereto by friction said clip adapted for connecting the ends of film broken during projection of the same.

GUENTHER WERNER.